Oct. 7, 1969        W. DRABIK        3,471,732
BRUSH HOLDER ASSEMBLY FOR TRACTION MOTORS
Filed Jan. 16, 1968        2 Sheets-Sheet 1

INVENTOR.
Walter Drabik
BY
Robert W. Smith
ATTORNEY

Oct. 7, 1969            W. DRABIK            3,471,732

BRUSH HOLDER ASSEMBLY FOR TRACTION MOTORS

Filed Jan. 16, 1968            2 Sheets-Sheet 2

INVENTOR.
Walter Drabik
BY
Robert W. Smith
ATTORNEY

United States Patent Office 3,471,732
Patented Oct. 7, 1969

3,471,732
BRUSH HOLDER ASSEMBLY FOR TRACTION MOTORS
Walter Drabik, Downers Grove, Ill., assignor to General Motors Corporation, Detroit, Mich., a corporation of Delaware
Filed Jan. 16, 1968, Ser. No. 698,251
Int. Cl. H02k 13/10; H01r 39/38
U.S. Cl. 310—239          6 Claims

ABSTRACT OF THE DISCLOSURE

In a preferred embodiment, a brush holder assembly is provided with a frame having a center portion which includes a continuous corrugated shaped cross-section extending between the frame side walls and formed by flat bottom surfaces that are separated by upwardly extending hollow ridges. Each bottom surface provides a receptacle for receiving separate brush spring assemblies which are mounted on a pair of spindles extending through the frame side walls and the sides of each hollow ridge. A vibration dampening tubular part having a resilient liner is interposed between the respective spindles and each of a pair of spring assembly spool members. Brush sets are slidably mounted at one end of the frame within brush retaining slots with each set being frictionally restrained within the slots by an arcuate flat spring extending downwardly along one of the slot sides.

---

This invention relates to a brush holder for dynamoelectric machines and more particularly to a brush holder having a rigid frame construction for traction motors and including improved vibration dampening and securing means for holding brush wafers relative to the traction motor commutator.

Brush holder assemblies utilized in large direct current motors such as those required in locomotive traction motors are subjected to severe vibrations and extended usage under conditions exposing the motor to a variety of operating conditions. The brush wafers must be maintained in an accurate fixed position relative to the rotating commutator while conducting high currents which subject the holder to arcing. The brush holder assembly must be rigidly mounted to the motor frame while being insulated therefrom to conduct current through the brushes to the motor commutator as the brushes are urged against the commutator segments at a substantially constant force. A spring biasing arrangement forces the brushes against the commutator and any vibration transmitted to the brushes causes increased arcing at the commutator segments in turn causing wear and decreased effectiveness. For increased current collecting capacity a plurality of brush wafer sets are required to be mounted in slots facing the commutator segments. The brush wafers must be slidably supported within the slots since they must be biased into continuous contact with the commutator as the brush ends wear away.

Accordingly, one of the objects of this invention is to provide a brush holder that includes a rigid frame that can be formed of a cast material such as phosphor bronze to support a plurality of brush sets and associated brush spring assemblies.

Another object of this invention is to provide a brush holder having a frame which has improved rigidity by utilizing a corrugated shaped cross-section which includes upwardly extending hollow ridges that also provide improved mounting receptacles for supporting brush spring assemblies.

Another object of this invention is to provide a brush holder arrangement with an improved means for retaining brush wafers in brush retaining slots which includes an arcuate flat spring biasing arrangement to force the wafers sidewardly within the brush slots.

A further object of this invention is to provide a brush holder arrangement wherein a brush spring assembly is resiliently mounted on spindles supported by the brush holder frame to prevent vibrations from being transmitted through the brush springs and connecting fingers to the brushes.

A still further object of this invention is to provide a brush holder which is arranged to suppress arcing flashovers, is easily assembled and maintained while providing a rugged structure for use in electric traction motors subjected to severe use and vibrations.

Further objects and advantages of the present invention will be apparent from the following description, reference being had to the accompanying drawings wherein a preferred embodiment of the present invention is clearly shown.

Figure 1:
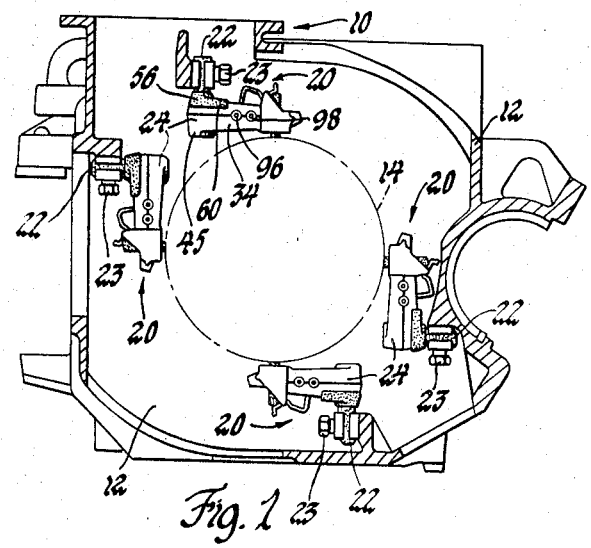
FIGURE 1 is an end view of an electric traction motor showing the brush holders of this invention mounted on the motor frame with the brushes engaging the motor commutator.

Referring to FIGURE 1, there is shown a four pole D-C electric traction motor indicated generally by the numeral 10 which includes a frame portion 12. The motor includes an armature having a rotatable commutator 14. Brush holder assemblies of the present invention indicated generally at 20 are circumferentially mounted about the periphery of commutator 14. Each brush holder assembly 20 is secured to the frame 12 by means of two insulated holder pins each designated by numeral 22. Pins 22 are clamped in place in side-by-side relationship by threaded bolts 23 in a conventional manner.

Figure 2:
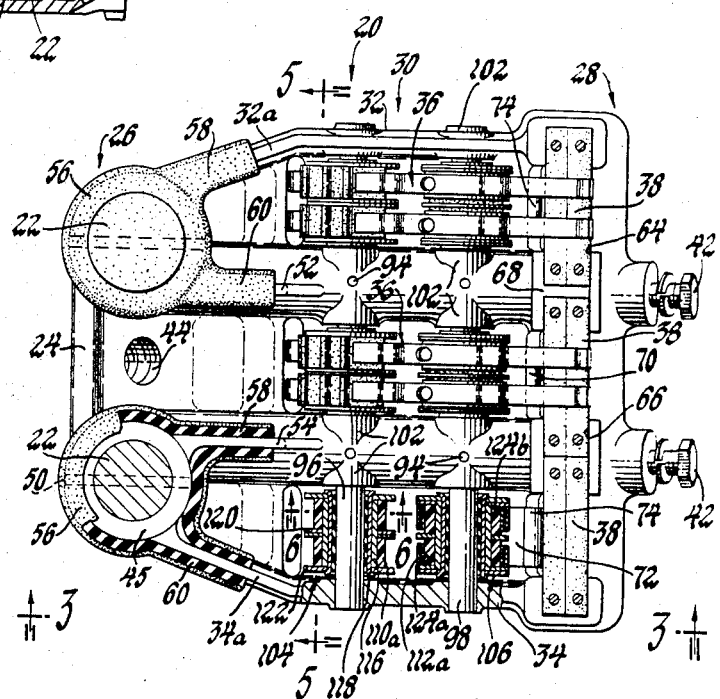
FIGURE 2 is a top plan view of a brush holder made in accordance with this invention.
Figure 3:
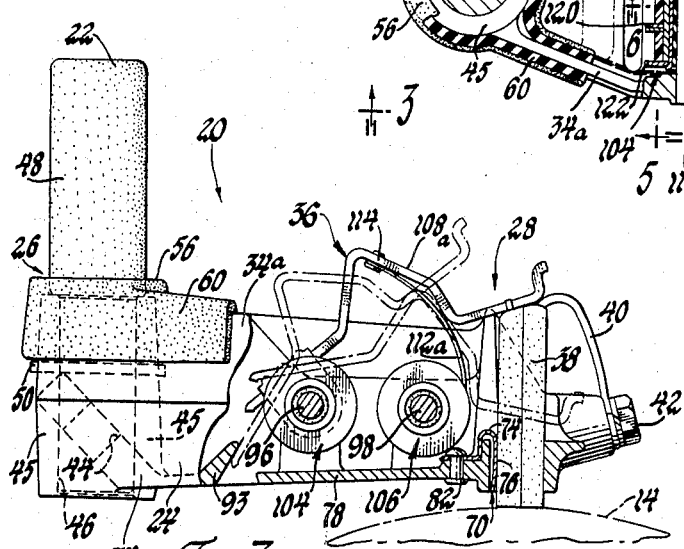
FIGURE 3 is a side elevation view with certain parts of the brush holder in section showing a spring assembly and a brush set mounted within a slot.
Figure 4:
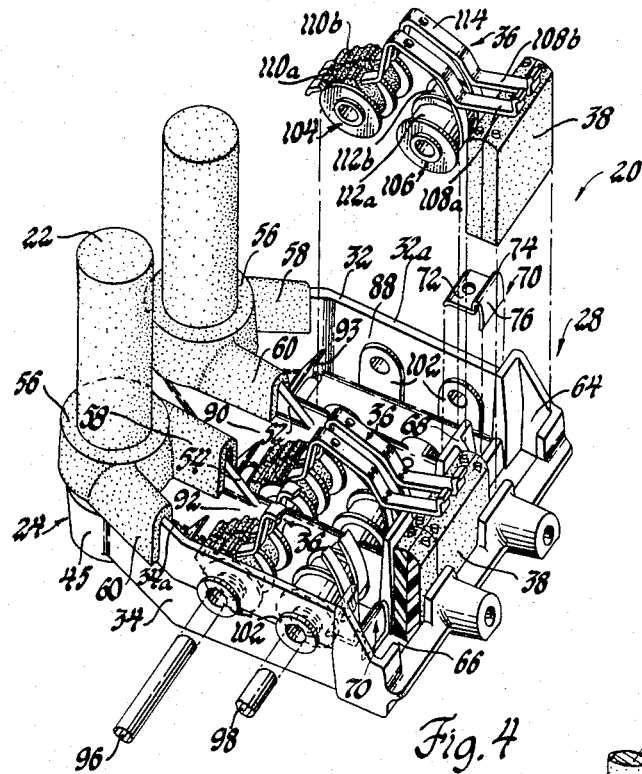
FIGURE 4 is a perspective of the brush holder of this invention showing an exploded view of one spring assembly, an associated brush set and a brush slot arcuate flat spring.

Referring now to FIGURES 2, 3 and 4, the brush holder assembly generally designated by numeral 20 of the present invention is shown including a one piece frame designated 24 which is made of a casting material such as phosphor bronze. Frame 24 includes a mounting portion generally designated by numeral 26 at one end, a brush retaining portion generally designated by numeral 28 at the other end and a center portion generally designated by numeral 30. Center portion 30 includes a pair of side walls designated by numerals 32 and 34, respectively, extending between the frame end portions 26 and 28. Three substantially identical brush spring assemblies each designated by the numeral 36 and described more fully hereinbelow are supported in the frame center portion 30. Mounting portion 26 is adapted to receive two of the holder pins 22 and the brush retaining portion 28 slidably supports three individual brush sets each being substantially identical and designated by the numeral 38.

Each brush set 38 comprises conventional split brushes having two or more similar carbon brush wafers mounted in face-to-face engaging relationship. Each brush wafer includes the usual shunt wire leads designated 40 which are electrically connected to frame 24 by a pair of bolts each designated 42. An external wire cable connection is made to the brush holder frame 24 at the threaded opening 44 by means of a terminal lug and bolt (not shown). Brush holder frame 24 provides an electrical conductive path between each brush set 38, shunt wire leads 40 to the terminal connection at opening 44.

Referring now to the mounting end frame portion 26, a pair of substantially identical upstanding cylindrical portions 45 having openings each designated 46 are provided for receiving insulated holder pins 22. Each of the holder pins 22 is formed of a steel bar material and has an upper portion 48 coated with a conventional insulating material. A transverse hole is provided in each pin 22 and also a matching hole which is radially aligned across each opening 46 is provided through each cylindrical portion 45. Two conventional slotted spring pins, 50, illustrated by phantom lines in FIGURES 2 and 3, are forced through the respectively aligned hole openings of the frame portion 45 and holder pins 22 to secure the frame 24 to each holder pin.

Figure 5:
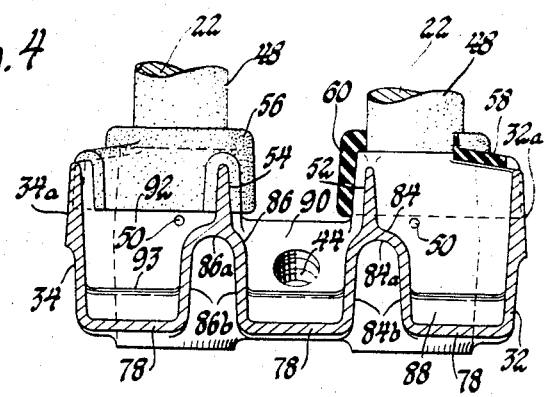
FIGURE 5 is a sectional view taken in the direction of the arrows along line 5—5 of FIGURE 2, illustrating the corrugated shaped cross-section of the brush holder frame of this invention.

Rib portions designated by numeral 52 and 54 as well as frame side walls 32 and 34 extend laterally from each upstanding cylindrical portion 45. Rib portions 52 and 54 provide additional protection from arc flashovers between two adjacent brush spring assemblies. Upper rib portions 32a and 34a of side walls 32 and 34, respectively, and the rib portions 52 and 54 have similarly shaped top surfaces which extend at the same horizontal level from each cylindrical portion 45. An increased tapered cross-sectional width provided in side wall rib portions 32a and 34a, as illustrated in FIGURE 5, increases the brush holder current carrying capacity.

Two substantially identical insulating boot members each designated 56 being formed of a molded silicone rubber material are fitted over the pin receiving opening 46 of each upstanding cylindrical portion 45 and also over the ribs 52 and 54 and side wall rib portions 32a and 34a. A circular hole is provided in each insulating boot 56 which is suitable to fit tightly around the insulated upper portion 48 of a holder pin 22. Each boot 56 has an integral pair of extending lip portions 58 and 60 each being formed to fit respectively over one of the rib portions 52 and 54 and one of the upper rib portions 32a and 34a of the respective side walls 32 and 34. Each insulating boot 56 serves as a locating means in assembling the holder assembly over the lower uninsulated portion of a pin 22 and also provides insulation protection from arc creepage along the surface of the brush holder frame to the motor frame 12.

Referring now to the brush retaining portion 30, two elongated slot openings 64 and 66 are provided for retaining three of the brush sets 38. The brush retaining slots 64 and 66 include side surfaces for supporting and guiding the outer wafer sides of each brush set 38. Slot 64 contains one set of split brushes 38 while the wider slot 66 is formed to receive two sets of brushes 38 in side by side relationship. A slot dividing bridge portion 68 separates the slots 64 and 66 and an additional bridge portion may be provided between the two brush sets in slot 66 if desired.

Arcuate flat springs designated 70 are mounted in the slots 64 and 66 for each brush set 38. Each arcuate flat spring 70, as illustrated in the exploded view of FIGURE 4, is formed of a resilient metal material and includes a substantially flat mounting portion 72, an upwardly extending U-shaped portion 74 and an arcuate downwardly extending portion 76. The spring mounting portion 72 includes a hole opening for securing the spring to a flat bottom portion 78 of the brush holder frame by a suitable means, for example, a rivet 82 which is illustrated in FIGURE 3. The U-shaped portion 74 fits over the top of an inner side slot opening and the arcuate portion 76 extends downwardly along the inner side of the slot. When a brush set 38 is inserted into one of the slots 64 or 66, the arcuate spring portion 76 is tangentially contacted by the side of the brush and is compressed. A resilient sideward biasing force is accordingly applied to the brush set to force it against the opposite slot side. Simultaneously, the adjacent side faces of the brush wafers are urged together and each brush set is therefore frictionally retained within the respective slots by a separate arcuate flat spring 70.

Each flat spring 70 is provided with sufficient resiliency so that each brush set 38 is frictionally biased within a slot by a greater force than that which causes brush rocking. Brush rocking movement occurs when commutator 14 reverses rotation at which time the brush face reseats itself against the periphery of the commutator. It can be seen that rocking movement of a brush set 38 between the slot sides is restrained by the biasing force of each spring 70.

Referring now to FIGURE 5, the cross section of the frame center portion 30 including a corrugated shape is illustrated. A corrugated cross section as referred to herein and in the appended claims refers to the cross-sectional shape of the frame center portion 30. A continuous corrugated design is provided by the two frame side walls 32 and 34, three substantially flat bottom portions each designated 78, and two hollow ridge portions designated 84 and 86, respectively, extending upwardly between adjacent bottom portions 78. The corrugated cross-sectional shape forms three channels that provide receptacles designated 88, 90 and 92. Each receptacle includes one of the bottom portions 78 and extends between the frame mounting end 26 and brush retaining end 28. Each of the receptacles 88, 90 and 92 is arranged to receive a separate brush spring assembly 36 as described further hereinbelow. An integral detent tab 93 extends upwardly from each frame bottom portion 78 in each of the receptacles near the mounting end 26.

Each of the hollow ridge portions 84 and 86 includes a rounded inverted U-shaped top portion respectively designated 84a and 86a and a pair of substantially parallel side walls or ribs respectively identified 84b and 86b. As can be seen from FIGURE 5, the two frame side walls 32 and 34 and two pairs of ridge side walls 84b and 86b provide the frame 24 with six upright wall portions for increased rigidity of the frame structure. The hollow ridge portions are an additional improvement over the use of a solid rib wall for separating brush spring assemblies. The aforementioned ribs 52 and 54 are formed on the rounded top portions of the hollow ridges toward the frame mounting end 26. Also the hollow ridges 84 and 86 are provided with a pair of spaced vertical hole openings extending through the top thereof to receive conventional slotted spring pins denoted by numeral 94 in FIGURE 2.

Two horizontal sets of aligned hole openings are provided in the side walls 32 and 34 and ridge side walls 84b and 86b to receive two substantially identical rod spindles 96 and 98. Accordingly, each set of spindle openings includes six holes and each opening is surrounded by a flattened boss portion generally designated by numeral 102. Boss portions 102 are formed on both sides of the side walls 32 and 34 and on the outer surfaces of the hollow ridge side walls 84b and 86b.

Spindles 96 and 98 have transverse holes which are aligned with the pair of vertical holes extending through the top of hollow ridge portions 84 and 86. A conventional split spring pin 94 is inserted through each of the vertical holes and into each spindle to secure the spindles 96 and 98 to the brush holder frame 24. The two spindles are accordingly fixed to frame 24 and firmly supported in the six spaced wall portions 32, 34, 84b and 86b.

Each spring assembly 36 described in the present invention is an improvement of the spring assembly described and claimed in the Millar Patent 3,146,365 issued Aug. 25, 1964, and assigned to the assignee of this invention. Each of the spring assemblies 36 is substantially identical and one is illustrated in upper portion of FIGURE 4 removed from the brush holder. Each spring assembly provides a combined brush spring and finger assembly as described hereinbelow.

Spool members designated 104 and 106 are provided with hole openings adapted to be resiliently mounted on spindles 96 and 98, respectively. Finger parts 108a and 108b have one extending end adapted for engagement with the top of each brush set 38. The second finger end is substantially straight and is slidably mounted in one of the finger guide portions designated 110a and 110b of spool 104. The second finger ends are of sufficient length to engage the detent tab 93 when the spring assembly is retracted. A pair of coil springs 112a and 112b are mounted on spool 106 wherein each respectively includes one end, not shown, fixed to the spool. A second end of each coil spring 112a and 112b is fastened, respectively, to a portion 114 intermediate the ends of each finger part 108a and 108b to provide a constant downward force at the extending ends of the finger parts which engage the brush sets 38.

The details of the arrangement of each spool member 104 and 106 is more clearly shown in the sectional view in the lower portion of FIGURE 2. Each spool member includes a bushing 116 mounted over a tubular part 118 formed as a tubular rivet to hold together the parts of each spool. Spool 104 includes the finger guide portions 110a and 110b, spacer washers 120 and end washers 122 mounted on a bushing 116. The ends of tubular part 118 are bent back against the end washers 122 to form a tubular rivet which is mounted on spindle 96. The spool 106 mounted on spindle 98 includes bobbin members 124a and 124b respectively having coil springs 112a and 112b wound thereon. The bobbin members as well as spacer washer 120 and end washers 122 are mounted on a bushing 116 in the same manner as described for spool 104.

Figure 7:
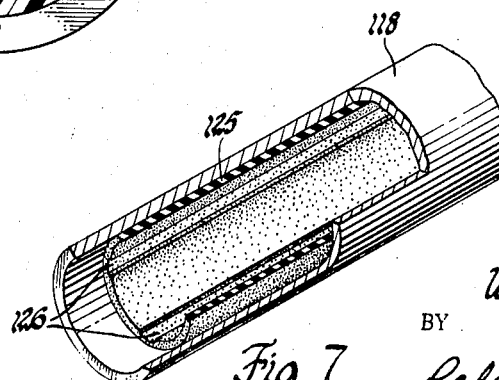
FIGURE 7 is a cutaway perspective view illustrating a tubular part which is formed into a rivet part and includes a resilient liner utilized to mount a spring assembly on a spindle in the brush holder of this invention.

The tubular part 118 is illustrated in FIGURE 7 as it appears prior to assembly to the spool members 84 and 86. A bonded resilient rubber liner 125 is provided along the inner periphery of the tubular part 118 being spaced from the ends to permit the ends to be bent back as noted hereinabove. The inner liner 120 is provided with four longitudinal grooves 126 to improve the resilience of the liner when mounted on each of the spindles 96 and 98 and also to facilitate assembly of the spool members onto the spindles.

Figure 6:
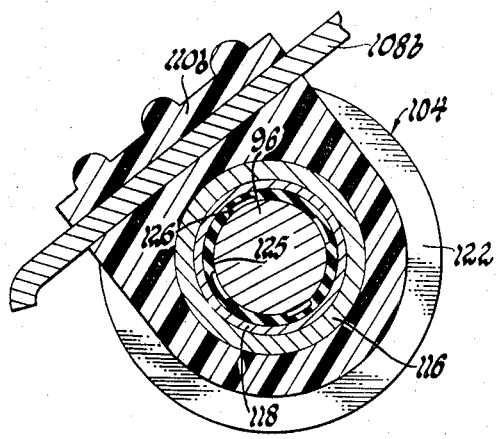
FIGURE 6 is a cross-sectional view taken in the direction of the arrows along line 6—6 of FIGURE 2, illustrating the mounting arrangement of the spring and finger assembly mounted on a spindle.

A typical assembly of a spool on a spindle is illustrated in the enlarged sectioned view of FIGURE 6 looking in the direction of the arrows 6—6 in FIGURE 2. The spool member 104 having a finger guide 110b is illustrated mounted on a bushing 116, and a tubular rivet 118 having the resilient liner 125 interposed between spindle 96 and spool member 104. The resilient liner provides improved vibration dampening so that each spring assembly 36 will not transmit vibrations of the brush holder frame to the brush wafers.

With each spring assembly 36 and brush set 38 assembled to the one piece frame 24 as described hereinabove, the brushes are biased against the commutator 14. Three operative positions of the finger part 108a is illustrated in FIGURE 3 by one set of solid lines and two sets of phantom lines. The spring force is maintained constant as the brushes wear away by finger parts 108a and 108b being forced downwardly against the brush sets by the uncoiling force of the coil springs 112a and 112b. The spools 104 and 106 will rotate about the respective spindles 96 and 98 when the finger parts are force to an inward position indicated by the lower set of phantom lines of FIGURE 3. When it is necessary to service or replace one of the brush sets 38, the finger parts 108a and 108b are moved outwardly by manual force as illustrated by the upper phantom lines in FIGURE 3. The coil springs of spool 106 unwind and the spool 104 rotates the finger guides so that the ends of finger parts will slide under the detent tab 93. The finger parts are biased against the tab 93 by the force of coil springs 112a and 112b to hold the spring assembly in the retracted position.

While the embodiments of the present invention as herein described constitute a preferred form, it is understood that other forms might be adopted without departing from the spirit of my invention.

I claim:

1. A brush holder assembly for a dynamoelectric machine comprising; a one piece frame including a first end portion and a second end portion, first and second frame side walls extending between said first and second end portions, a plurality of hollow ridge portions positioned between the side walls and extending from said first end portion to said second end portion, said hollow ridge portions being spaced apart from each other and from said frame side walls, the spaces between said hollow ridge portions and between a hollow ridge portion and a frame side wall defining a plurality of receptacles each adapted to receive a brush spring assembly, a plurality of openings formed in one of said first and second end portion each being aligned respectively with said receptacles, said openings adapted to receive brushes, a first and second set of aligned openings formed in said frame side walls and in said hollow ridge portions, first and second spindles respectively disposed in said first and second set of aligned openings, and a brush spring assembly located within each of said receptacles, each brush spring assembly having first and second spool members respectively receiving said first and second spindles, a spring means connected to said first spool member, and a finger means connected to said second spool member and further connected to said spring means with said finger means including a free end extending over an opening in said one end portion for urging a brush against a commutator of a dynamoelectric machine.

2. A brush holder assembly for a dynamoelectric machine comprising: a one piece frame member including a first end portion, a second end portion, and a center portion including a pair of frame side walls extending between said first and second end portions; said first end portion including a plurality of openings including slot spaces each adapted to receive a brush set; said center portion further including a plurality of bottom portions and a plurality of hollow ridge portions, each of said bottom portions being aligned with one of said slot spaces and each of said hollow ridge portions extending upwardly between two bottom portions to form a corrugated cross section that includes said pair of frame side walls, said corrugated cross section of said center portion defining a plurality of receptacles each adapted to receive a brush spring assembly; said pair of frame side walls and said plurality of hollow ridge portions including first and second sets of aligned openings; first and second spindles included respectively in said first and second sets of aligned openings; and a plurality of brush spring assemblies located in said receptacles, each brush spring assembly including first and second spool members adapted to receive respectively said first and second spindles, a finger member having one finger end connected to said first spool member and a second end overlying one of said slot spaces adapted to receive a brush set, and a spring means having one spring end connected to said second spool member and a second spring end connected intermediate the ends of said finger member whereby said second end of the finger member biases a brush set located in one of the slot spaces toward a commutator of a dynamoelectric machine.

3. A brush holder assembly for a dynamoelectric machine comprising: a one piece frame member formed of a phosphor bronze casting material including first and second end portions and an integral center portion having a corrugated cross section extending between said first and second end portions; said corrugated cross section including first and second frame side walls, a plurality of horizontal frame bottom portions, and a plurality of hollow ridge portions each extending upwardly between adjacent bottom portions so that said corrugated cross section defines a plurality of receptacles each adapted to receive a brush spring assembly; said first end portion including a plurality of slot openings each aligned with one of said receptacles and including two opposing vertical slot sides adapted to receive a brush set, one of said slot sides of each slot opening including an arcuate flat spring member extending along the slot side to bias a brush set located in the slot opening against the opposing slot side; said corrugated cross section of the center portion including first and second sets of aligned openings extending through said frame side walls and said hollow ridge portions; first and second sets of aligned openings; and a plurality of brush spring assemblies located in said receptacles, each brush spring assembly including first and second spool members adapted to receive respectively said first and second spindles, a finger member having one end connected to said first spool member and a second end overlying one of said slot openings, and a coil spring wound on said second spool member and connected intermediate the ends of said finger member whereby said second end of the finger member biases a brush set located in one of the slot openings toward a commutator of a dynamoelectric machine.

4. A brush holder assembly for a dynamoelectric machine comprising: a one piece frame member including a first end portion, a second end portion, and a center portion including a pair of frame side walls extending between said first and second end portions; said first end portion including a plurality of openings including slot spaces each adapted to receive a brush set; said center portion further including a plurality of bottom portions and a plurality of hollow ridge portions, each of said bottom portions being aligned with one of said slot spaces and each of said hollow ridge portions extending upwardly between the bottom portions to form a corrugated cross section that includes said pair of frame side walls, said corrugated cross section of said center portion defining a plurality of receptacles each adapted to receive a brush spring assembly; said pair of frame side walls and said plurality of hollow ridge portions including first and second sets of aligned openings; first and second spindles included respectively in said first and second sets of aligned openings; and a plurality of brush spring assemblies located in said receptacles, each brush spring assembly including first and second spool members receiving respectively said first and second spindles, first and second tubular parts each having a resilient liner interposed respectively between said first and second spool members and said first and second spindles, a finger member having one finger end connected to said first spool member and a second end overlying one of said slot spaces adapted to receive a brush set, and a spring means having one spring end connected to said second spool member and a second spring end connected intermediate the ends of said finger member whereby said second end of the finger member biases a brush set located in one of the slot spaces toward a commutator of a dynamoelectric machine.

5. A brush holder assembly for a dynamoelectric machine comprising: a one piece frame member formed of a phosphor bronze casting material including first and second end portions and an integral center portion having a corrugated cross section extending between said first and second end portions; said corrugated cross section including first and second frame side walls, a plurality of horizontal frame bottom portions, and a plurality of hollow ridge portions each extending upwardly between adjacent bottom portions so that said corrugated cross section defines a plurality of receptacles each adapted to receive a brush spring assembly; said first end portion including a plurality of slot openings each aligned with one of said receptacles and including two opposing vertical slot sides adapted to receive a brush set, one of said slot sides of each slot opening including a flat spring member respectively secured to each frame bottom portion and having a resilient arcuate part extending downwardly along the slot side to bias a brush set located in the slot opening against the opposing slot side; said corrugated cross section of the center portion including first and second sets of aligned openings extending through said frame side walls and said hollow ridge portions; first and second spindles included respectively in said first and second sets of aligned openings; and a plurality of brush spring assemblies located in said receptacles, each brush spring assembly including first and second spool members each having a tubular center part with a resilient rubber liner rotatably mounted respectively on said first and second spindles, a finger member having one end connected to said first spool member and a second end overlying one of said slot openings, and a coil spring wound on said second spool member and connected intermediate the ends of said finger member whereby said second end of the finger member biases a brush set located in one of the slot openings toward a commutator of a dynamoelectric machine.

6. The brush holder assembly for a dynamoelectric machine of claim 5 wherein said resilient rubber liner includes a plurality of circumferentially spaced grooves extending longitudinally along the inner periphery of the liner.

References Cited
UNITED STATES PATENTS

| | | | |
|---|---|---|---|
| 732,240 | 6/1903 | Underwood | 310—246 |
| 2,532,827 | 12/1950 | Thomas | 310—246 |
| 3,271,605 | 9/1966 | Drabik | 310—239 |
| 3,387,155 | 6/1968 | Krulls | 310—247 |

MILTON O. HIRSHFIELD, Primary Examiner

L. L. SMITH, Assistant Examiner

U.S. Cl. X.R.

310—245

PO-1050
(5/69)

UNITED STATES PATENT OFFICE
CERTIFICATE OF CORRECTION

Patent No. __3,471,732__          Dated __October 7, 1969__

Inventor(s) __Walter Drabik__

It is certified that error appears in the above-identified patent and that said Letters Patent are hereby corrected as shown below:

In the claims, Claim 3, column 7, line 19, after the semicolon insert -- first and second spindles included respectively in said --.

(SEALED)
JAN -- 1970

Jan 6 - 1970

(SEAL)
Attest:

Edward M. Fletcher, Jr.

Attesting Officer

WILLIAM E. SCHUYLER, JR.
Commissioner of Patents